United States Patent
Shapira

(10) Patent No.: US 9,345,001 B2
(45) Date of Patent: May 17, 2016

(54) METHOD, APPARATUS AND SYSTEM OF SPATIAL DIVISION MULTIPLE ACCESS COMMUNICATION IN A WIRELESS LOCAL AREA NETWORK

(71) Applicant: Celeno Communications Ltd., Ra'anana (IL)

(72) Inventor: Nir Shapira, Ra'anana (IL)

(73) Assignee: Celeno Communications Ltd., Raanana (IL)

( * ) Notice: Subject to any disclaimer, the term of this patent is extended or adjusted under 35 U.S.C. 154(b) by 116 days.

(21) Appl. No.: 14/022,292

(22) Filed: Sep. 10, 2013

(65) Prior Publication Data

US 2014/0010196 A1 Jan. 9, 2014

Related U.S. Application Data

(63) Continuation of application No. 13/081,233, filed on Apr. 6, 2011, now Pat. No. 8,532,078, which is a continuation of application No. 11/430,136, filed on May 9, 2006, now abandoned, which is a continuation-in-part of application No. 11/319,526, filed on Dec. 29, 2005, now Pat. No. 7,656,965.

(51) Int. Cl.
| | |
|---|---|
| *H04L 1/00* | (2006.01) |
| *H04W 72/04* | (2009.01) |
| *H04B 7/26* | (2006.01) |
| *H04W 56/00* | (2009.01) |
| *H04W 36/18* | (2009.01) |
| *H04W 92/10* | (2009.01) |

(52) U.S. Cl.
CPC ............. *H04W 72/04* (2013.01); *H04B 7/2681* (2013.01); *H04W 56/0005* (2013.01); *H04W 36/18* (2013.01); *H04W 92/10* (2013.01)

(58) Field of Classification Search
CPC ... H04L 5/0007; H04L 5/0008; H04L 5/0009; H04L 1/0003; H04L 1/0004; H04L 1/0005; H04L 1/0006
USPC ............... 370/203–210, 329; 455/454, 456.2, 455/560, 525, 562.1
See application file for complete search history.

(56) References Cited

U.S. PATENT DOCUMENTS

| | | |
|---|---|---|
| 5,864,548 A | 1/1999 | Liu |
| 6,166,667 A | 12/2000 | Park |
| 6,563,858 B1 | 5/2003 | Fakatselis et al. |
| 6,721,302 B1 | 4/2004 | Alastalo |
| 6,873,293 B2 | 3/2005 | Proctor, Jr. et al. |
| 6,895,258 B1 | 5/2005 | Scherzer et al. |
| 6,928,047 B1 | 8/2005 | Xia |
| 6,940,843 B2 | 9/2005 | Goodall et al. |
| 6,961,545 B2 | 11/2005 | Tehrani et al. |
| 6,970,682 B2 | 11/2005 | Crilly, Jr. et al. |
| 6,999,430 B2 | 2/2006 | Holtzman et al. |
| 7,034,759 B2 | 4/2006 | Proctor, Jr. et al. |

(Continued)

OTHER PUBLICATIONS

IEEE-Std 802.11, 1999 Edition (ISO/IEC 8802-11:1990).

(Continued)

*Primary Examiner* — Dady Chery
(74) *Attorney, Agent, or Firm* — Pearl Cohen Zedek Latzer Baratz LLP

(57) ABSTRACT

Some demonstrative embodiments of the invention include a method, apparatus for concurrently transmitting data to two or more wireless stations.

19 Claims, 8 Drawing Sheets

(56) References Cited

U.S. PATENT DOCUMENTS

| | | |
|---|---|---|
| 7,039,090 B2 | 5/2006 | Boetzel et al. |
| 7,039,137 B1 | 5/2006 | Lauterjung et al. |
| 7,050,402 B2 | 5/2006 | Schmidl et al. |
| 7,088,671 B1 | 8/2006 | Monsen |
| 7,099,380 B1 | 8/2006 | Feng et al. |
| 7,103,326 B2 | 9/2006 | Wu et al. |
| 7,120,468 B1 | 10/2006 | Wilhoyte et al. |
| 7,139,321 B2 | 11/2006 | Giannakis et al. |
| 7,139,323 B2 | 11/2006 | Erving et al. |
| 7,149,254 B2 | 12/2006 | Sampath |
| 7,289,585 B2 | 10/2007 | Sandhu et al. |
| 7,319,888 B2 | 1/2008 | Li et al. |
| 8,199,723 B2 | 6/2012 | Li et al. |
| 2002/0041635 A1 | 4/2002 | Ma et al. |
| 2002/0061031 A1 | 5/2002 | Sugar et al. |
| 2002/0097780 A1 | 7/2002 | Odenwalder et al. |
| 2002/0146981 A1 | 10/2002 | Saint-Hilaire et al. |
| 2002/0150168 A1 | 10/2002 | Crawford |
| 2002/0160737 A1 | 10/2002 | Crawford |
| 2002/0181546 A1 | 12/2002 | Odenwalder et al. |
| 2002/0188750 A1 | 12/2002 | Li |
| 2003/0112901 A1 | 6/2003 | Gupta |
| 2003/0128658 A1 | 7/2003 | Walton et al. |
| 2003/0139196 A1 | 7/2003 | Medvedev et al. |
| 2004/0117497 A1 | 6/2004 | Park |
| 2004/0125820 A1 | 7/2004 | Rios |
| 2004/0203383 A1 | 10/2004 | Kelton et al. |
| 2004/0258012 A1 | 12/2004 | Ishii |
| 2005/0025042 A1 | 2/2005 | Hadad |
| 2005/0025176 A1 | 2/2005 | Ko et al. |
| 2005/0030929 A1 | 2/2005 | Swier et al. |
| 2005/0047322 A1 | 3/2005 | Sondur |
| 2005/0047384 A1 | 3/2005 | Wax et al. |
| 2005/0058217 A1 | 3/2005 | Sandhu et al. |
| 2005/0063408 A1 | 3/2005 | Famolari |
| 2005/0105629 A1 | 5/2005 | Hottinen et al. |
| 2005/0124369 A1 | 6/2005 | Attar et al. |
| 2005/0129020 A1 | 6/2005 | Doyle et al. |
| 2005/0135284 A1 | 6/2005 | Nanda et al. |
| 2005/0136933 A1 | 6/2005 | Sandhu et al. |
| 2005/0141412 A1 | 6/2005 | Sadri et al. |
| 2005/0147023 A1* | 7/2005 | Stephens et al. ............. 370/203 |
| 2005/0152324 A1 | 7/2005 | Benveniste |
| 2005/0169232 A1 | 8/2005 | Sakoda et al. |
| 2005/0201361 A1 | 9/2005 | Morioka et al. |
| 2005/0233709 A1 | 10/2005 | Gardner et al. |
| 2005/0255892 A1 | 11/2005 | Wong et al. |
| 2005/0285719 A1 | 12/2005 | Stephens |
| 2005/0286474 A1 | 12/2005 | van Zelst et al. |
| 2006/0023803 A1 | 2/2006 | Perlman et al. |
| 2006/0030364 A1 | 2/2006 | Olesen et al. |
| 2006/0039312 A1 | 2/2006 | Walton et al. |
| 2006/0062189 A1 | 3/2006 | Takeuchi |
| 2006/0067421 A1 | 3/2006 | Walton et al. |
| 2006/0078059 A1 | 4/2006 | Ok et al. |
| 2006/0092885 A1 | 5/2006 | Brockmann et al. |
| 2006/0104379 A1 | 5/2006 | Li et al. |
| 2006/0109814 A1 | 5/2006 | Kuzminsky et al. |
| 2006/0120225 A1 | 6/2006 | Choi |
| 2006/0140172 A1 | 6/2006 | Trainin |
| 2006/0140290 A1 | 6/2006 | Li et al. |
| 2006/0164972 A1 | 7/2006 | van Rensburg et al. |
| 2006/0165114 A1 | 7/2006 | Diepstraten et al. |
| 2006/0203935 A1 | 9/2006 | Li et al. |
| 2006/0280116 A1 | 12/2006 | Ji et al. |
| 2006/0286937 A1 | 12/2006 | Russell et al. |
| 2006/0291439 A1 | 12/2006 | Yang et al. |
| 2006/0291544 A1 | 12/2006 | Fischer et al. |
| 2007/0077936 A1 | 4/2007 | Tomisawa et al. |
| 2007/0153714 A1 | 7/2007 | Shapira et al. |
| 2007/0153748 A1 | 7/2007 | Shapira |
| 2007/0155353 A1 | 7/2007 | Shapira et al. |
| 2007/0177681 A1 | 8/2007 | Choi et al. |
| 2007/0280360 A1 | 12/2007 | Ihm et al. |

OTHER PUBLICATIONS

"IEEE Std 802.11 n-2009," IEEE 802.11ac standard.

"IEEE-Std 802.11b-1999 Supplement to 802.11-1999, Wireless LAN MAC and PHY specifications: Higher speed Physical Layer (PHY) extension in the 2.4 GHz band".

"IEEE-Std 802.11a-1999, Higher speed Physical Layer (PHY) extension in the 5GHz band".

"IEEE-Std 802.11g-2003 Supplement to 802.11-1999, Wireless LAN MAC and PHY specifications: Further Higher Data Rate Extension in the 2.4 GHz band, Draft 8.2".

"IEEE-Std 802.11e-2005 Specific requirements Part 11: Wireless LAN Medium Access Control (MAC) and Physical Layer (PHY) specifications Amendment 8: Medium Access Control (MAC) Quality of Service Enhancements".

Search Report for International Application No. PCT/IL06/01490 mailed Jun. 26, 2008.

Tse et al., "Fundamentals of Wireless Communication", Sep. 10, 2004, pp. 523-548, Cambridge University Press.

Yoo et al., On the Optimality of Multi-Antenna Broadcast Scheduling Using Zero-Forcing Beamforming, 2006, pp. 1-13.

Final Office Action for U.S. Appl. No. 11/430,136 mailed Dec. 19, 2008.

Office Action for U.S. Appl. No. 11/430,136 mailed Aug. 28, 2009.

Office Action for U.S. Appl. No. 13/081,233 mailed Nov. 28, 2011.

Office Action for U.S. Appl. No. 11/430,136 mailed May 30, 2008.

Office Action for U.S. Appl. No. 13/081,233 mailed Oct. 16, 2012.

* cited by examiner

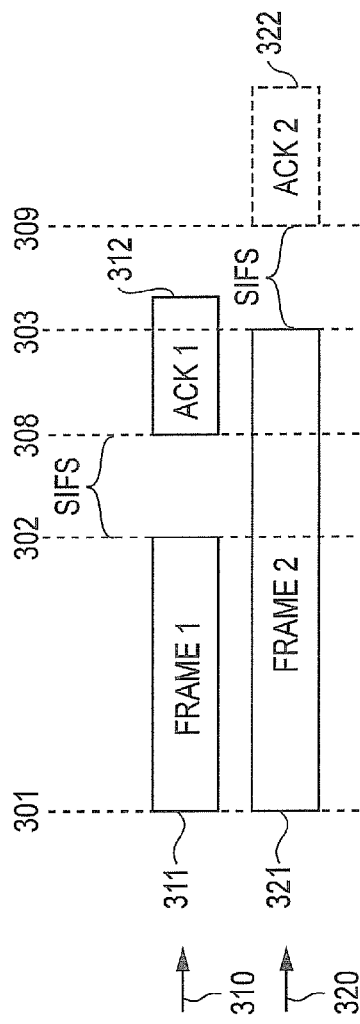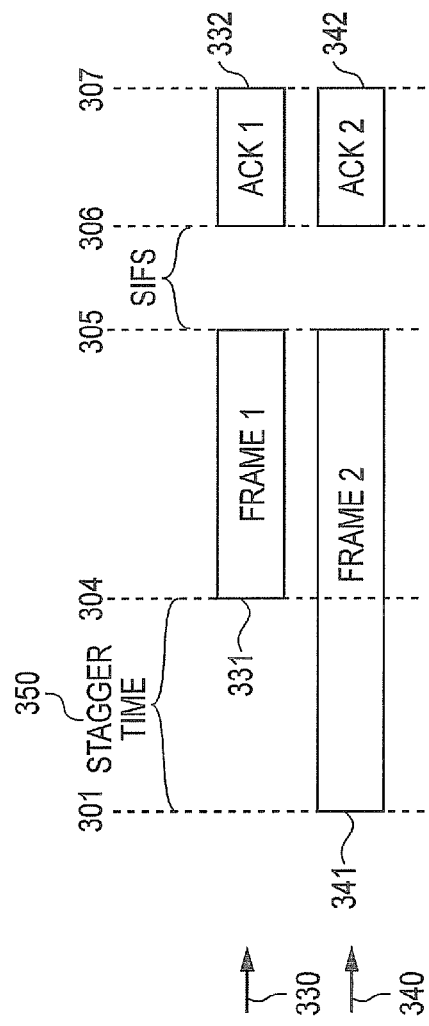

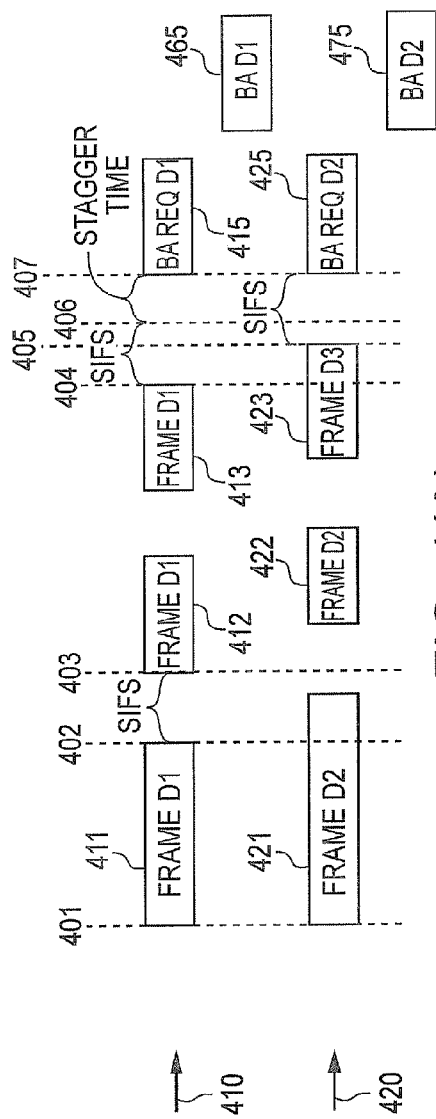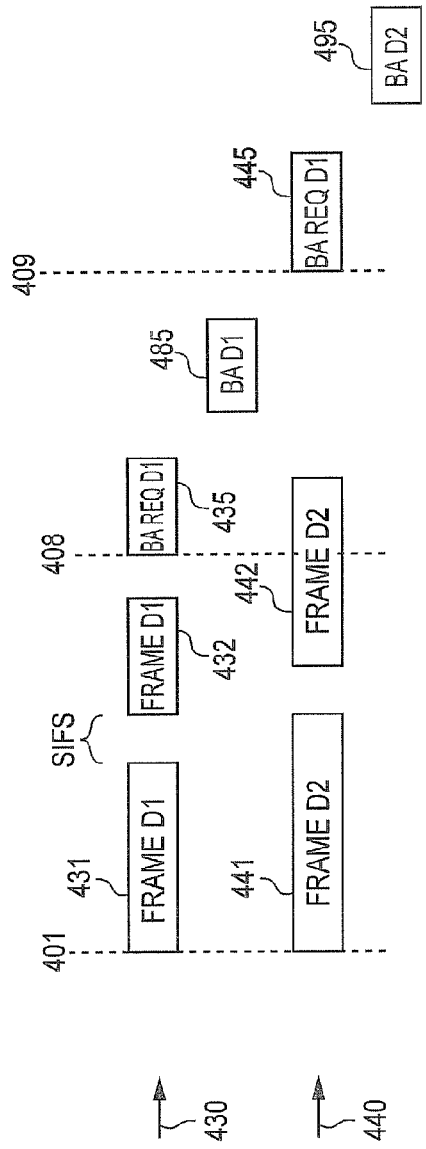

METHOD, APPARATUS AND SYSTEM OF SPATIAL DIVISION MULTIPLE ACCESS COMMUNICATION IN A WIRELESS LOCAL AREA NETWORK

CROSS REFERENCE TO RELATED APPLICATIONS

This application is a continuation application of U.S. patent application Ser. No. 13/081,233, filed Apr. 6, 2011, now issued as U.S. Pat. No. 8,532,078, which in turn is a continuation application of U.S. patent application Ser. No. 11/430,136, filed May 9, 2006, now abandoned, which is a continuation-in-part application of U.S. patent application Ser. No. 11/319,526, filed Dec. 29, 2005, now issued as U.S. Pat. No. 7,656,965, the entire disclosures of which are incorporated herein by reference.

FIELD OF THE INVENTION

The present invention relates to the field of wireless communication. In particular, embodiments of the invention relate to a method, apparatus and system for use of Spatial Division Multiple Access (SDMA) in a wireless local area network (WLAN).

BACKGROUND OF THE INVENTION

In a wireless local area network (WLAN), a single central base station, e.g., an access point (AP) may communicate with multiple mobile stations (STA) over a wireless communication link in what may be referred to as point to multi-point communication. For example, the AP may utilize a time domain duplexing (TDD) channel access scheme, in which transmissions to the multiple stations may be multiplexed in different time slots in the same frequency band, or a frequency domain duplexing (FDD) channel access scheme, in which transmissions to the multiple stations may occur simultaneously, but in different frequency bands. Thus, although an AP in a WLAN may potentially communicate with multiple users, in many cases, for example, in TDD and/or FDD systems, the communication is point to point at any single instance of time and frequency.

Spatial division multiple access (SDMA) is a method of multiplexing several signal streams, each one targeted to a different destination, simultaneously, by utilizing multiple antennas. An SDMA channel access method may enable the use of the same frequency at the same time to communicate with several stations located in different places. For example, an SDMA AP having multiple antennas may use a beamforming technique to transmit to several remote stations simultaneously. Each transmit antenna may transmit the intended signal multiplied by a certain weight, and by dynamically controlling the weights of each antenna the transmission may be directed to a desired location. Under certain assumptions, it can be shown that data transmissions to N users can be multiplexed together using N antennas, for a total capacity increase by a factor N compared with simple legacy networks that allow access to the wireless medium for only a single user at a time.

However, the integration of higher capacity transmission technology into existing wireless LANs may require operation in accordance with the existing systems' physical layer (PHY) and media access control layer (MAC) protocols, e.g., for backwards compatibility. For example, the MAC protocol may ensure that all users have an equal opportunity to contend for access to the medium, provide means for avoiding collisions, e.g., due to concurrent transmissions by two or more stations, and provide a method of recovery from collisions.

The Institute of Electrical and Electronics Engineers (IEEE) 802.11 family of standards ("IEEE-Std 802.11, 1999 Edition (ISO/IEC 8802-11: 1999)" and derivatives thereof) provides one current MAC protocol for WLAN systems. For example, the IEEE 802.11 MAC may regulate access to the wireless medium by equal priority for access contention, e.g., using a collision sense multiple access/collision avoidance (CSMA/CA) scheme, in which each station implements a carrier sense mechanism to detect the state of the wireless medium, and a positive acknowledgement scheme to ensure correct reception of data frames.

Backward compatibility of APs with user stations operating on earlier, slower versions of a transmission standard may reduce overall throughput. For example, in the IEEE 802.11g standard the throughput may reach 54 Mbps. However, in a deployment scenario having legacy stations designed to an earlier standard, e.g., IEEE 802.11b, that may communicate at less than 11 Mbps, the legacy stations may dominate the usage of the wireless medium to the detriment of user stations of more recent design. This problem may be further compounded as new standards such as, e.g., the IEEE 802.11n multiple-input-multiple-output (MIMO) standard which allows for data rates over 100 Mbps, are deployed.

SUMMARY OF SOME DEMONSTRATIVE EMBODIMENTS OF THE INVENTION

Some demonstrative embodiments of the invention include a method, apparatus, and/or system of performing simultaneous downlink transmission over a wireless medium to a plurality of wireless stations, using Spatial Division Multiple Access (SDMA) in a wireless local area network (WLAN).

According to some demonstrative embodiments of the invention, the system and method may concurrently transmit data to two or more wireless stations, by: obtaining a first aggregated data frame to be transmitted to a first station; obtaining second and third aggregated data frames to be transmitted to a second station; and concurrently transmitting the first aggregated data frame to the first station and the second aggregated data frame and a fragment of the third aggregated data frame to the second station, wherein the transmission duration of the first aggregated data frame is substantially equal to the transmission duration of the second aggregated data frame and the fragment of the third aggregated data frame.

According to some demonstrative embodiments of the invention, the system and method may concurrently transmit data to two or more wireless stations, by: obtaining a first aggregated data frame to be transmitted to a first station; obtaining a second aggregated data frame to be transmitted to a second station; selecting a first transmission rate, a first transmission power, a second transmission rate, and a second transmission power such that the first and second transmission durations are substantially equal, wherein transmission duration is the product of a length of a frame and a transmission rate; and concurrently transmitting the first aggregated data frame to the first station at the first data transmission rate and the first transmission power and the second aggregated data frame to the second station at the second data transmission rate and the second transmission power.

According to some embodiments of the invention, the first aggregated data frame may be longer than the second aggregated data frame, and the second transmission power may be greater than the first transmission power.

According to some embodiments of the invention, the first transmission rate may be less than the second transmission rate.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIGS. 3A and 3B are schematic timing diagrams showing start-time and end-time coordination, respectively, which may be used by methods of simultaneous wireless transmission in accordance with some demonstrative embodiments of the invention;

FIGS. 4A and 4B are schematic timing diagrams showing simultaneous block acknowledgments and sequential block acknowledgements, respectively, which may be used by methods of simultaneous wireless transmission in accordance with some demonstrative embodiments of the invention;

Figure 1:
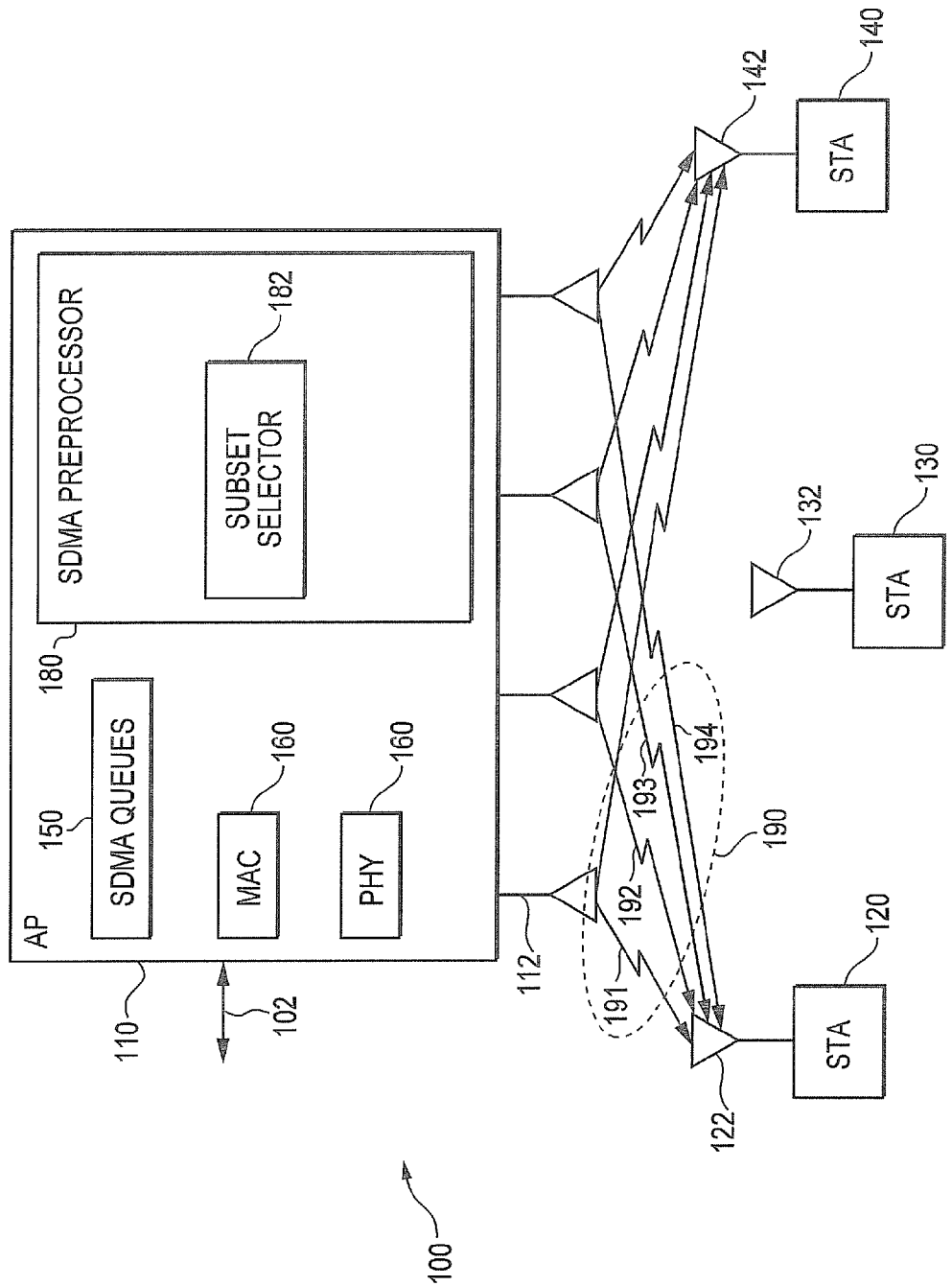
FIG. 1 is a schematic diagram of wireless communication system in accordance with some demonstrative embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, systems described by the "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band", "IEEE-Std 802.11g-2003 Supplement to 802.11-1999, Wireless LAN MAC and PHY specifications: Further Higher Data Rate Extension in the 2.4 GHz band, Draft 8.2", "IEEE-Std 802.11e-2005 Specific requirements Part 11: Wireless LAN Medium Access Control (MAC) and Physical Layer (PHY) specifications Amendment 8: Medium Access Control (MAC) Quality of Service Enhancements", and the like.

Types of WLAN stations intended to be within the scope of the present invention include, although are not limited to, stations for receiving and/or transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems, and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Part of the discussion herein may relate, for demonstrative purposes, to transmitting a frame, e.g., a physical layer (PHY) protocol data unit (PPDU) or a media access control (MAC) service data unit (MSDU). However, embodiments of the invention are not limited in this regard, and may include, for example, transmitting a signal, a packet, a block, a data portion, a data sequence, a data signal, a data packet, a preamble, a signal field, a content, an item, a message, or the like.

FIG. 1 schematically illustrates a block diagram of a wireless communication system 100 in accordance with some demonstrative embodiments of the invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Wireless communication system 100 may include, for example, one or more wireless Access Points (APs), e.g., an AP 110 having N transmit antennas 112, suitable, e.g., for spatial division multiple access (SDMA) transmission. System 100 may also include one or more stations (STAs), e.g., stations 120, 130, and 140 having one or more radio frequency antennas 122, 132, and 142, respectively, to receive transmissions from AP 110. Antennas 112, 122, 132, and 142 may include, for example, a dipole antenna, omnidirectional antenna, semi-omnidirectional antenna, and/or any other type of antenna suitable for transmission and/or reception of radio frequency signals.

According to some demonstrative embodiments of the invention, AP 110 may communicate with one or more of stations 120, 130, and 140 via one or more wireless communication links, e.g., a downlink 190 and/or an uplink (not shown). For example, downlink 190 may include one or more wireless channels, e.g., spatial channels 191, 192, 193 and/or 194 corresponding to the plurality of antennas 112. AP 110 may transmit to one or more of STA 120, 130, and/or 140 via the multiple antennas 112 using an SDMA transmission scheme, e.g., as explained in detail below with reference to FIGS. 2, 3, 4 and/or 5. Stations 120, 130, and 140 may be adapted to SDMA operation or may operate according to legacy standards, e.g., IEEE 802.11.

It will be appreciated that although FIG. 1 schematically illustrates three stations for demonstrative purposes, system 100 may include more than three stations. Although embodiments of the invention are not limited in this respect, AP 110 may communicate with a large number, denoted U, of remote stations, wherein U may be much larger, for example, than the N transmit antennas. For example, in accordance with some embodiments of the invention, AP 110 may divide the set of U stations into subsets, e.g., equal to or smaller than the number of antennas N, for simultaneous transmission. Thus, AP 110 may use the N antennas 112 for forming a plurality of orthogonal beams, e.g., such that the power directed toward the intended destination stations in the subset is maximized, while interference generated to other stations may be minimized, e.g., using a beamforming technique. Although embodiments of the invention are not limited in this respect, AP 110 may select the subset of destination stations according to a predefined criterion such as, e.g., maximizing the overall sum rate of transmissions to the subset members, or maximizing the quality of service (QoS) for the subset members.

According to some demonstrative embodiments of the invention, AP 110 may generate the set of spatial channels, e.g., K spatial channels, to be transmitted, using antennas 112, to the set of destination stations, e.g., K destination stations including one or more of stations 120, 130 and 140, by applying a precoding matrix to a set of inputs including a set of transmissions, e.g., K transmissions, intended to the set of destination stations, respectively. The precoding matrix may include, for example, a set of beamforming vectors, e.g., K beamforming vectors, which may be based, for example, on channel state information of the set of destination stations, respectively. Each beamforming vector may be, for example, of size N, resulting in a precoding matrix, denoted W, that may be, for example, of size K×N. In some embodiments, the precoding matrix W may include one or more additional vectors orthogonal to the beamforming vectors, which may supplement the matrix W to be an orthogonal N×N matrix. The precoding matrix W may be defined for example, for each frequency bin, e.g., in OFDM operation.

According to some demonstrative embodiments of the invention, AP 110 may include a SDMA preprocessor 180 to process and prepare data intended for transmission to one or more respective users, as described below. For example, preprocessor 180 may include a subset selector 182 to select a subset of user stations, allocate data to be transmitted to the selected subset, and to compute beamforming vectors for transmission, as described below. Although embodiments of the invention are not limited in this respect, preprocessor 180 may include high-bandwidth inputs, e.g., for receiving channel estimates; and/or high-bandwidth outputs, e.g., for providing parameters necessary for transmission, e.g., the vectors of the precoding matrix. Preprocessor 180 may be implemented using any suitable combination of memory, hardwired logic, and/or general-purpose or special-purpose processors, as is known in the art. In accordance with different demonstrative embodiments of the invention, preprocessor 180 may be implemented as a separate entity or as subsystem of either a Media Access Controller (MAC) 160, and/or a Physical Layer (PHY) 170.

In some embodiments, the SDMA transmission process may be controlled by MAC 160 or other suitable entity. Although the invention is not limited in this respect, MAC 160 may perform functions of the data link layer of the seven-layer Open Systems Interconnect (OSI) model of network communication protocols, as known in the art. MAC 160 may receive, for example, user data from higher network layers, e.g., data intended for stations 120 and 140, as shown in FIG. 1.

According to some demonstrative embodiments of the invention, the following components of AP 110 may perform functions associated with processing and preparing data for SDMA transmission: SDMA queues 150, MAC 160, PHY 170, and/or SDMA preprocessor 180. Alternatively, AP 110 may include any other suitable components for performing these functions.

SDMA queues 150 may include, for example, a set of queues that may store incoming data, e.g., from network interface 102, prior to SDMA transmission. In accordance with some embodiments of the present invention, AP 110 may implement one queue per user per priority and per traffic type, as compared to legacy WLAN standards, e.g., IEEE 802.11, that implement a single queue per priority level. For example, a system that supports U users and P priority levels may include U•P queues in SDMA queues 150. Maintaining these U•P queues may enable the subset selection mechanism to associate packets destined to orthogonal stations.

In some embodiments, MAC 160 may include a superset of pre-existing single-user-at-a-time MAC systems that operate in accordance with a known WLAN standard, e.g., IEEE 802.11. Alternatively, MAC 160 may be specifically adapted for SDMA operation while retaining backward compatibility with a known WLAN standard, e.g., the IEEE 802.11 standard. For a set of N transmissions, e.g. using N antennas 112, MAC 160 may perform the MAC functions for N packets, e.g., simultaneously. In addition, MAC 160 may control the sequence of events involved in the SDMA transmission, e.g., as described below.

In some embodiments, PHY 170 may include, for example, N instances of pre-existing PHY units that may operate in accordance with a current WLAN standard, e.g., the IEEE 802.11 standard, along with a module that may perform the SDMA beamforming as the physical layer of a modem (not shown in FIG. 1). Alternatively, PHY 170 may be specifically adapted for SDMA operation while retaining backward compatibility with a current WLAN standard, e.g., the IEEE 802.11 standard.

According to some demonstrative embodiments of the invention, subset selector 182 may determine the data subsets for SDMA transmission to up to U users. In determining the data subsets, subset selector 182 may interact with, for example, SDMA queues 150, MAC 160, and/or PHY 170. Although the invention is not limited in this respect, subset selector 182 may partition the frames in SDMA queues 150 into SDMA subsets, e.g., according to the queue status and the spatial channel characteristics of the remote station. In alternate embodiments, subset selector 182 may partition the frames according to any other suitable criteria. Subset selector 182 may pass the information regarding subset members to MAC 150 or other suitable entity for sequencing. Subset selector 182 may also compute the beamforming vectors to be used by PHY 170 for frame transmission. It is to be understood that these computations may be performed by other modules in preprocessor 180 or elsewhere in AP 110 without departing from the scope of the invention.

Although the invention is not limited in this respect, according to some demonstrative embodiments of the invention, AP 110 may transmit to one or more of stations 120, 130 and 140 downlink transmissions of high-priority traffic, e.g., video traffic, during one or more transmission cycles. For example, AP 110 may divide a transmission cycle into a first time interval ("the high-priority interval"), having a period $T_{VD}$; and a second time interval ("the other traffic interval"), having a period $T_{OT}$.

According to some demonstrative embodiments of the invention, AP 110 may perform one or more operations of a SDMA transmission method, e.g., as described below with reference to FIGS. 2, 3A, 3B, 4A, 4B, and/or 5, during the high-priority interval, e.g., to perform downlink transmission of high priority traffic including, for example, Quality of Service (QoS) constrained streams, e.g., including video streams. Although the invention is not limited in this respect, it will be appreciated by those of ordinary skill in the art that the term "high-priority" traffic as used herein may include any stream having a particular set of QoS constraints. The high-priority traffic may include, for example, a transmission stream carrying a particular kind of traffic characterized by a set of QoS parameters, e.g., PER target, delay constraint, jitter constraint, bandwidth, and the like.

According to some demonstrative embodiments of the invention, during the "other traffic" time interval AP 110 may perform any suitable uplink and/or downlink transmission operations, which may include, for example, sporadic uplink traffic, delayed block ACK, downlink broadcast, and/or allowing for the operation of neighboring Basic Service Sets (BSSs). For example, AP 110 may operate within the "other traffic" interval at a mode ("the normal mode of operation") in accordance with any suitable communication standard, e.g., the 802.11 standard.

According to some demonstrative embodiments of the invention, AP 110 may divide a period, denoted $T_{cyc}$, the transmission cycle, e.g., as follows:

$$T_{cyc}=T_{VD}+T_{OT} \quad \text{(Equation 1)}$$

According to some demonstrative embodiments of the invention, a span of the $T_{cyc}$ period may be, for example, in the order of 10 milliseconds (ms); the $T_{OT}$ period may be, for example, at least 1 ms, e.g., depending on uplink rates. A short $T_{cyc}$ period may result, for example, in using a relatively long period for "other traffic" transmissions. Although the invention is not limited in this respect, voice over IP VoIP transmissions for uplink and/or downlink may be passed, for example, during the $T_{OT}$ period, while VoIP frame delay may be critical for adequate voice quality. Furthermore, delayed block ACK reply may be expected during the $T_{OT}$ period, e.g., as described below. Thus, a long $T_{cyc}$ period may result in long video frame delays and an increase in system delay.

Figure 2:
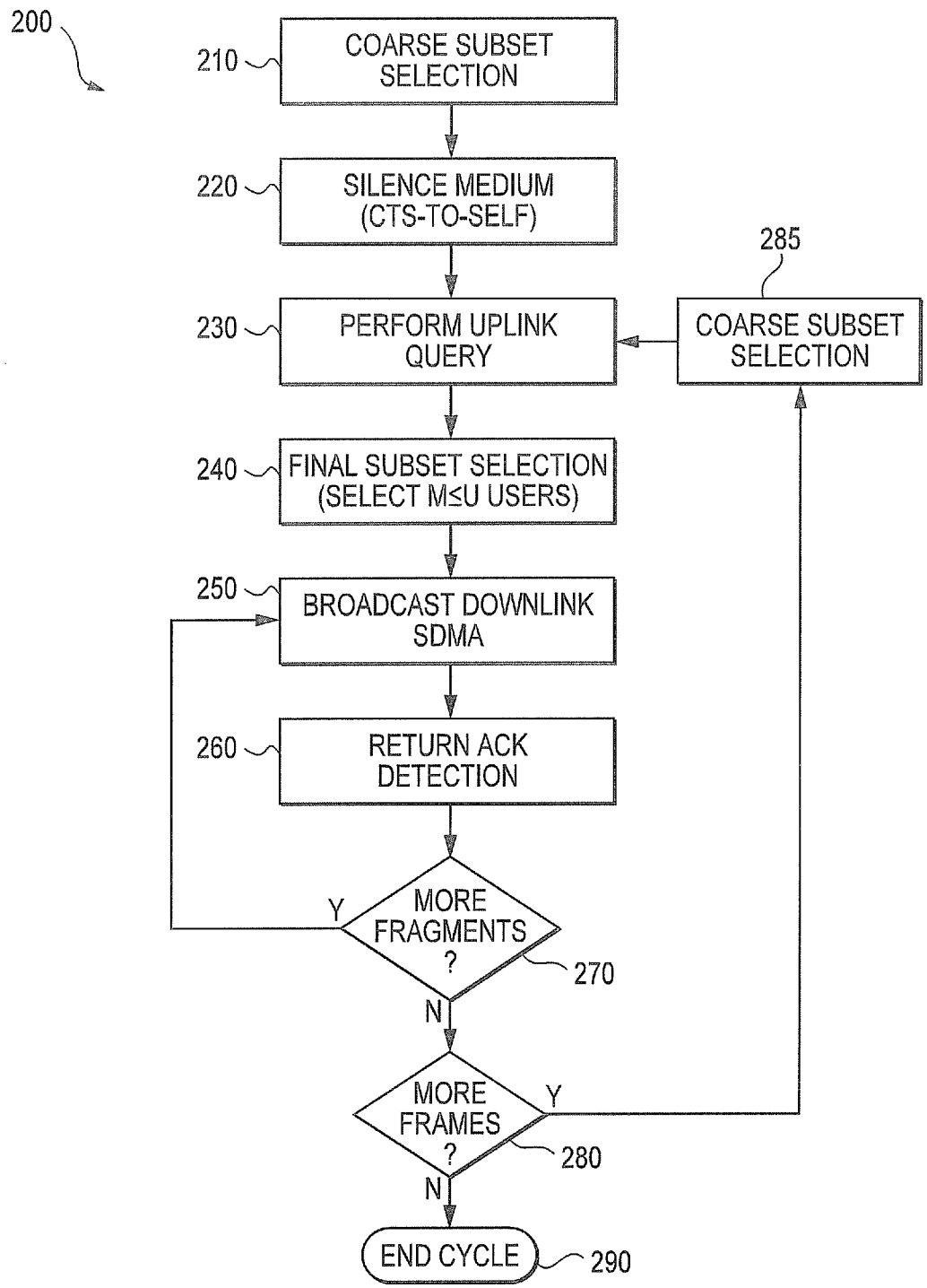
FIG. 2 is a schematic flowchart of a method of wireless transmission in accordance with one demonstrative embodiment of the invention.

Reference is also made to FIG. 2, which schematically illustrates a method 200 of wireless transmission in accordance with one demonstrative embodiment of the invention. Although not limited in this respect, one or more operations of the method of FIG. 2 may be performed by a suitable AP, e.g. AP 110, in a WLAN to transmit network data to selected users.

As indicated at block 210, the method may include performing a coarse selection of a subset of stations from which the relevant candidate stations for the SDMA transmission may be selected. The initial subset selection may reduce the burden on SDMA preprocessor 180 of performing exact fine subset selection on a large set of candidate stations, which may require a complex algorithm, and may also reduce the overhead involved in sending learning frames to a large group of candidate stations in order to obtain channel state information. Although embodiments of the invention are not limited in this respect, SDMA preprocessor 180 may reduce the candidate group size from a maximum of U user stations, e.g., to a number which is closer to N (the number of antennas 112), for example, by using simple, non-computationally intensive operations. For example, a non-limiting list of such operations may include ranking according to priority, signal strength, or past subset information which has not completely aged, and/or may include other suitably simple operations. For example, subset selector 182 may use information from past subset selection decisions, e.g., to predict that including certain stations in a subset may result in a poor sum rate, and thereby avoid that selection. Stations may be selected to be substantially orthogonal, for example, orthogonality may be checked based on the cross-correlation between the spatial signatures of the candidate stations.

As indicated at block 220, the method may include reserving the wireless medium for a duration sufficient for completing the simultaneous downlink transmission to the wireless stations of the selected set of stations. For example, the method may include silencing the wireless medium before downlink transmission. For example, silencing the medium may include sending a clear to send-to-self (CTS-to-self) broadcast frame to indicate that the AP plans to reserve the medium for the time needed to complete the SDMA downlink cycle. Although the invention is not limited in this respect, the reservation time span may be taken from the estimate generated in the coarse subset selection. In alternate embodiments, the reservation time span may be computed by other suitable methods. For example, the desired time span may be set in the duration field of the CTS-to-self frame. All stations that receive this frame may be required to refrain from transmission for the period of time set in the duration field, e.g., as defined by the 802.11 standard. Optionally, in some embodiments the reservation time span may be determined according to a fairness criterion, for example, to allow other stations into the medium, e.g., for uplink traffic to take place. In such embodiments, the reservation time span may be sufficiently short so as to not disrupt or delay sensitive traffic of other stations, e.g., VoIP packets or frames. For example, to enable VoIP traffic by other stations, the reservation time may be in the order of 10 ms, although embodiments of the invention are not limited in this regard. After the medium is relinquished for the use of other stations, a new reservation cycle may begin.

As indicated at block 230, the method may include performing a channel query for a group of stations, for example, those selected in coarse subset selection, e.g., to obtain updated channel estimates and/or spatial signatures. In certain TDD systems, the downlink channel may be assumed to be identical to the uplink channel under the channel reciprocity assumption, and an implicit channel estimate method may be used. In such cases, the downlink channel estimate of each station may be obtained, for example, by sending a short packet to each station that may elicit another packet as a reply from the respective stations, and the uplink channel states may then be estimated from the stations' respective reply signals. In other cases, for example, where the reciprocity assumption does not hold, explicit channel estimates may be obtained by, for example, by having the remote station return the downlink channel state as a response to an explicit downlink query request.

According to some non-limiting embodiments of the invention, the channel query may be obtained, e.g., in an 802.11 WLAN system, by sending a Null-Data frame that does not carry actual data to the stations, and each station may respond with an acknowledgement (ACK) frame from which the uplink channel state may be estimated. Alternatively, a Block ACK Request frame (BAR) may be used as a query frame, to which each station may return a Block ACK (BA) frame from which the uplink channel state may be obtained. The downlink channel state may be obtained implicitly under the reciprocity assumption. Although the invention is not limited in this respect, channel queries may be performed sequentially for each station that was selected by the coarse subset selection mechanism and/or, in some alternative embodiments, only for those stations for which the most recent channel estimate may be deemed outdated.

As indicated at block 240, method 200 may also include performing a fine subset selection, e.g., after the channel states have been updated. A set of M final stations, where M≤N, to be included in the subsequently transmitted SDMA subset may be chosen according to a suitable optimization metric such as, but not limited to, e.g., maximum sum-rate or the maximum of the minimum rate of the M users. For example, the fine subset selection may include enumerating all possible subsets (for U≤N, there are $2^U-1$ ways to arrange the U stations in subsets, excluding the trivial subset of zero stations), calculating the achievable sum-rate for each possible subset under the given power constraint of the system, and/or choosing the subset of M stations having the maximum sum-rate. It will be appreciated that, for the U subsets of size one, the sum rate may be computed based on the rate possible for standard WLAN transmission; whereas for larger subsets of two or more stations, the sum-rate computation may involve a more complicated calculation of channel matrix inversion. In some embodiments of the invention, the set of beamforming vectors may be determined as part of the fine subset selection.

Optionally, in other embodiments of the invention, the fine subset selection and beamforming vector computation may be performed incrementally, e.g., such that the algorithm may run in parallel to the channel queries. For these embodiments, the initial computation may be performed after the first station channel query. The calculation may be updated incrementally, e.g., each time another channel estimate is obtained, until a final channel estimate may be completed. At this point, only the last step of the subset selection algorithm may remain to be performed. This incremental computation may enable SDMA preprocessor 180 (FIG. 1) to perform the calculation over a long time span, thereby possibly reducing hardware and software resource requirements. In some embodiments, the incremental computation may be used to select a preliminary subset based on information regarding a reduced number of stations, schedule downlink transmission for the preliminary subset, and continue selection of a primary subset, e.g., to be scheduled immediately after transmission to the first subset, based on the remaining stations' channel state information. Thus, the incremental computation method may prevent transmission delay while waiting for the completion of the final subset selection computations.

As indicated at block 250, method 200 may include performing an SDMA downlink transmission, e.g., beginning after completion of the fine subset selection and beamforming vector computation. Alternatively, method 200 may begin SDMA transmission for a preliminary subset while still calculating the final subset selection, and continue SDMA transmission for a primary subset when all calculations are complete, e.g., as described below with reference to FIG. 5. In some embodiments, e.g., where N frames are transmitted simultaneously to N stations and an immediate (simultaneous) ACK policy is used, the overall time span of the preliminary SDMA subset transmission may equal that of the longest duration frame in the subset.

Although the invention is not limited in this respect, according to some demonstrative embodiments of the invention, the downlink SDMA may be performed at an Equal Frames Span (EFS) or an Unconstrained Frames Span (UFS). In the UFS mode, the simultaneous frames for subset members may be unsynchronized. For example, at the start of the subset transmission the frames may be transmitted simultaneously. Since each frame in UFS mode can have a different rate, the transmission of different frames may end at unsynchronized times. For each station, the next frame may start a SIFS period after its previous frame. When a UFS subset is scheduled for a particular span, the number of frames transmitted to each station during the period may vary, and may depend, for example, on the frame's length and rate. The end of a UFS subset may have some inefficiencies since the subset span may not be an integer multiple of each station's frames span. In the EFS mode, frames may be constrained to start together, e.g., as described below.

Reference is now made to FIGS. 3A and 3B, which schematically illustrate timing of data frames for simultaneous wireless transmission in accordance with some demonstrative embodiments of the invention.

Referring to FIG. 3A, two data streams 310 and 320, respectively, may be transmitted simultaneously by an AP to two user stations such as, e.g., stations 120 and 140, respectively, with an identical transmission start time 301. The data frames of each data stream, frame 311 and frame 321, may have differing time spans and consequently may end at different times 302 and 303, respectively.

According to some embodiments of the invention, e.g., for 802.11 WLAN systems, receiving stations may be required to respond to a correctly received packet by transmitting an ACK frame. The ACK frame may be required to be returned after a pre-defined (e.g., constant or fixed) time interval which may be referred to as the Short Inter-Frame Space (SIFS). As illustrated in FIG. 3A, the AP, e.g., AP 110 (FIG. 1), may begin the transmission of frame 311 to a first station, e.g., station 120 (FIG. 1), and the transmission of frame 321 to a second station, e.g., station 140 (FIG. 1), substantially simultaneously, e.g., at time 301. The first station may begin transmitting an ACK frame 312 at time 308, e.g., following the predefined SIFS from frame 311. The second station may begin transmitting an ACK frame 322 at time 309, e.g., following the predefined SIFS from frame 321. Due to the shorter time span of frame 311 relative to the time span of frame 321, the first station may reply with ACK 312 prior to the completion of the transmission of frame 321 by the AP, thereby introducing a collision. For example, AP 110 (FIG. 1) may be in transmit mode at time 308 and not in receive mode, and may thus not detect ACK frame 312 from station 120 (FIG. 1). In addition, the transmission of ACK frame 312 may interfere with the proper reception of data frame 321 by station 140 (FIG. 1), which may result in corruption of the data frame due to interference. If station 140 (FIG. 1) receives a corrupted frame 321, station 140 (FIG. 1) may not send ACK frame 322 at time 309, a situation which may be referred to as the "return ACK problem".

Referring to FIG. 3B, an SDMA WLAN transmission system in accordance with some demonstrative embodiments of the present invention, e.g., system 100 of FIG. 1, may solve the return ACK problem by using a staggered transmission scheme. According to some embodiments of the invention, MAC 160 (FIG. 1) may schedule frame transmission times of each subset, for example, such that two or more, e.g., all, the frames in the subset end substantially at the same time. This timing may ensure that two or more, e.g., all, ACK frames may be sent after all the frames have been transmitted. To achieve that, the frames in the subset may be sent staggered in time. For example, two data streams 330 and 340 may be transmitted substantially simultaneously to two user stations, e.g., stations 120 and 140 (FIG. 1), wherein frame 331 may have the same time span as frame 311 and frame 341 may have the same time span as frame 321. However, in this scenario the transmission start times of data streams 330 and 340, times 301 and 304 respectively, may differ.

As indicated in FIG. 3B, the AP may stagger the start times for the transmission of frames 331 and 341, e.g., times 304 and 301 respectively. By offsetting the transmission start time 304 of the shorter frame, i.e., frame 331, by a "stagger time" 350 equal to the difference in time span of the two frames, two ACK frames 332 and 342 may start simultaneously at time 306 and/or return substantially simultaneously at time 307, e.g., after a short inter-frame space (SIFS) interval. It will be appreciated, however, that stagger time 350 may represent unused transmission time. Thus, in accordance with demonstrative embodiments of the invention, the transmission time spans of the frames of the chosen subset may be, for example, as close to equal as possible, so as to utilize the wireless medium efficiently.

Although embodiments of the invention are not limited in this respect, SDMA system 100 (FIG. 1) may employ a method to equalize the time spans of the N transmissions, for example, by controlling the transmit rate for each station. For example, according to one embodiment of the invention, the transmit rate to a station may be controlled, e.g., by decreasing or increasing the power allocation to the station so as to decrease or increase the corresponding transmit rate, respectively. According to another embodiment of the invention, each frame may be transmitted at a particular modulation and coding scheme (MCS) appropriate to the signal to noise ratio (SNR) experienced by the corresponding station intended to receive the frame. The time span of the frame transmission may be calculated as the ratio of the packet length, e.g., in bits, and the transmit rate, e.g., in bits per second, of the MCS. Another method of substantially equalizing the transmission time span may include, for example, fragmenting a relatively longer frame into smaller fragments such that the fragments' duration equals the duration of a shorter frame transmitted to another station in the subset. It will be appreciated that the terms "longer" and "shorter" frames, as used herein, may refer to the time span required for transmitting a frame, which may depend, for example, on the packet size, and/or on the transmit rate for the frames.

Although embodiments of the invention are not limited in this respect, a time span equalization algorithm may be incorporated as part of the fine subset selection algorithm of the invention. Additionally or alternatively, the time spans may be partially equalized in the coarse subset selection, for example, by trying to match user stations that have similar length packets in their respective queues and also have similar receive signal strengths (RSSs). It will be appreciated that the RSS may be a good predictor of the SNR, and the ultimate transmission rate.

Reference is now made to FIG. 4A, which schematically illustrates a simultaneous block acknowledgment mechanism that may be used by methods of simultaneous wireless transmission in accordance with some embodiments of the invention. Although embodiments of the invention are not limited in this respect, an ACK response may not be mandatory after each received frame. For example, the IEEE 802.11e quality of service (QoS) extension of the IEEE 802.11 standard defines a mechanism for block acknowledgement (block ACK, referred to herein as "BA"), in which the AP may transmit a block of frames followed by a request for acknowledgement of the transmitted block, and, if the block of frames is successfully received, the station may send a BA frame in confirmation. For embodiments of the invention where a block ACK may be defined, there may be no need for the staggering scheme described above as the wireless medium may be used in a more efficient manner.

As illustrated in FIG. 4A, the AP may transmit simultaneously in SDMA to multiple user station, e.g., three stations 120, 130 and 140 (FIG. 1), and may transmit using one or more data streams and/or channels, for example, two data streams 410 and 420. In accordance with embodiments of the invention, the AP may send up to N simultaneous transmissions via up to N spatial channels or streams, where N is the number of transmit antennas. In the present example, two spatial streams are illustrated for clarity of demonstration, but it is understood that embodiments of the invention may include more than two channels or streams. In addition, it will be appreciated that at each particular instance in time, the two spatial streams may be used to substantially simultaneously transmit to two stations. However, SDMA transmission to more than two stations using two channels may be accomplished by substantially simultaneous transmission to a first SDMA subset including two stations, e.g., stations 120 and 130 (FIG. 1), followed by substantially simultaneous transmission to a second subset including two stations, e.g., stations 120 and 140 (FIG. 1).

As shown in FIG. 4A, the AP may transmit one or more frames to each of stations 120, 130, and 140 (FIG. 1), for example: three frames 411, 412, and 413 to station 120 (FIG. 1), two frames 421 and 422 to station 130, and one frame 423 to station 140 (FIG. 1). It will be appreciated that, since an immediate ACK response may not be expected after each frame, aligning the frames to the different user stations may no longer be required. Two or more successive frames of a transmitted block may be separated by a predefined SIFS period, e.g., shown in FIG. 4A as the difference between times 402 and 403. At the end of the block ACK period, e.g., at time 407, the AP may substantially simultaneously send BA request frames 415 and 425 to those stations whose blocks may be complete, e.g., stations 120 and 130 (FIG. 1), respectively. In addition, a BA request frame may be sent to another station, e.g., station 140 (FIG. 1), after, for example, a later block. It will be appreciated that sending the BA requests substantially simultaneously may ensure that the returned BA frames are transmitted and received substantially simultaneously. It will be further appreciated that any unused stagger time, e.g., the time difference between times 406 and 407, may be negligible when using a block ACK mechanism for a transmission block of multiple frames, for example, as compared to a single frame transmission block when BA may not be supported. Additionally or alternatively, the AP may align the simultaneously transmitted frames, e.g., using a time span equalization algorithm as described above with reference to FIG. 3, to align the frames' respective SIFS times to reduce interference.

Referring to FIG. 4B, which schematically illustrates a sequential block acknowledgment mechanism that may be used by methods of simultaneous wireless transmission in accordance with some embodiments of the invention, the AP may request BA frames sequentially instead of simultaneously. FIG. 4B schematically illustrates an exemplary scenario in which the AP may transmit substantially simultaneously in SDMA to multiple user stations supporting block ACK, e.g., stations 120 and 130 (FIG. 1), using one or more data streams and/or channels, e.g., data streams 430 and 440, respectively, but with sequential BA frame requests. For example, as illustrated in FIG. 4B, a first BA frame request 435 may be sent to station 120 (FIG. 1) at time 408, e.g., after a frame 432 of block 431 is transmitted to station 120 (FIG. 1). However, the AP may delay transmitting BA frame request 445 to station 130 (FIG. 1), for example, by a minimum of the time span needed to receive the BA 485 from station 120 (FIG. 1), e.g., until a time 409. Depending on the block acknowledgement policy in use, station 120 (FIG. 1) may transmit block ACK 485 either immediately after receiving BA request 435 and a SIFS time (as shown), or the station may delay transmitting BA 485 to a later time. It will be appreciated that this sequential BA frame request transmission may result in the returned BA frames not overlapping, which may ease detection by the AP at the cost of extending the time needed to complete the entire transaction Referring back to FIG. 2, as indicated at block 260, the AP may be required to detect the returning ACK frames from all stations to which it transmitted. Thus, a robust ACK presence detection scheme may be required to maintain the integrity of the MAC 160's protocol. According to some demonstrative embodiments of the invention, complete detection of the simultaneous ACK frame contents, including the decoding of the check sum bits in the frame trailer, may require uplink SDMA by AP 110 (FIG. 1). As is known in the art, uplink SDMA may be accomplished by applying receive beamforming techniques on each uplink signal.

As indicated at decision block 270, if the outgoing queues contain additional data fragments intended for the user subset selected in block 240 and/or if one or more return ACK signals were not detected, transmission method 200 may return to block 250. The downlink transmission method may repeat the SDMA downlink transmission and return ACK detection for any remaining and/or unsuccessfully transmitted fragments or frames, e.g., until all data for the intended user subset is successfully transmitted.

As indicated at decision block 280, if the outgoing SDMA queues 150 contain additional data frames for a different set of remote stations, method 200 may calculate a new coarse subset of users as indicated at block 285. Method 200 may perform uplink queries to the newly calculated subset of stations, select a new final subset, broadcast the additional data frames, and detect return ACKs, e.g., as described above. To enable channel learning from the uplink queries, method 200 may optionally re-silence the medium, e.g., by sending a CTS-to self frame to reserve a time span as indicated at block 220. Although embodiments of the invention are not limited in this respect, the medium may be silenced whenever the reserved time span expires. As indicated at block 290, the downlink transmission cycle may end when all pending data frames are successfully transmitted.

Figure 5:
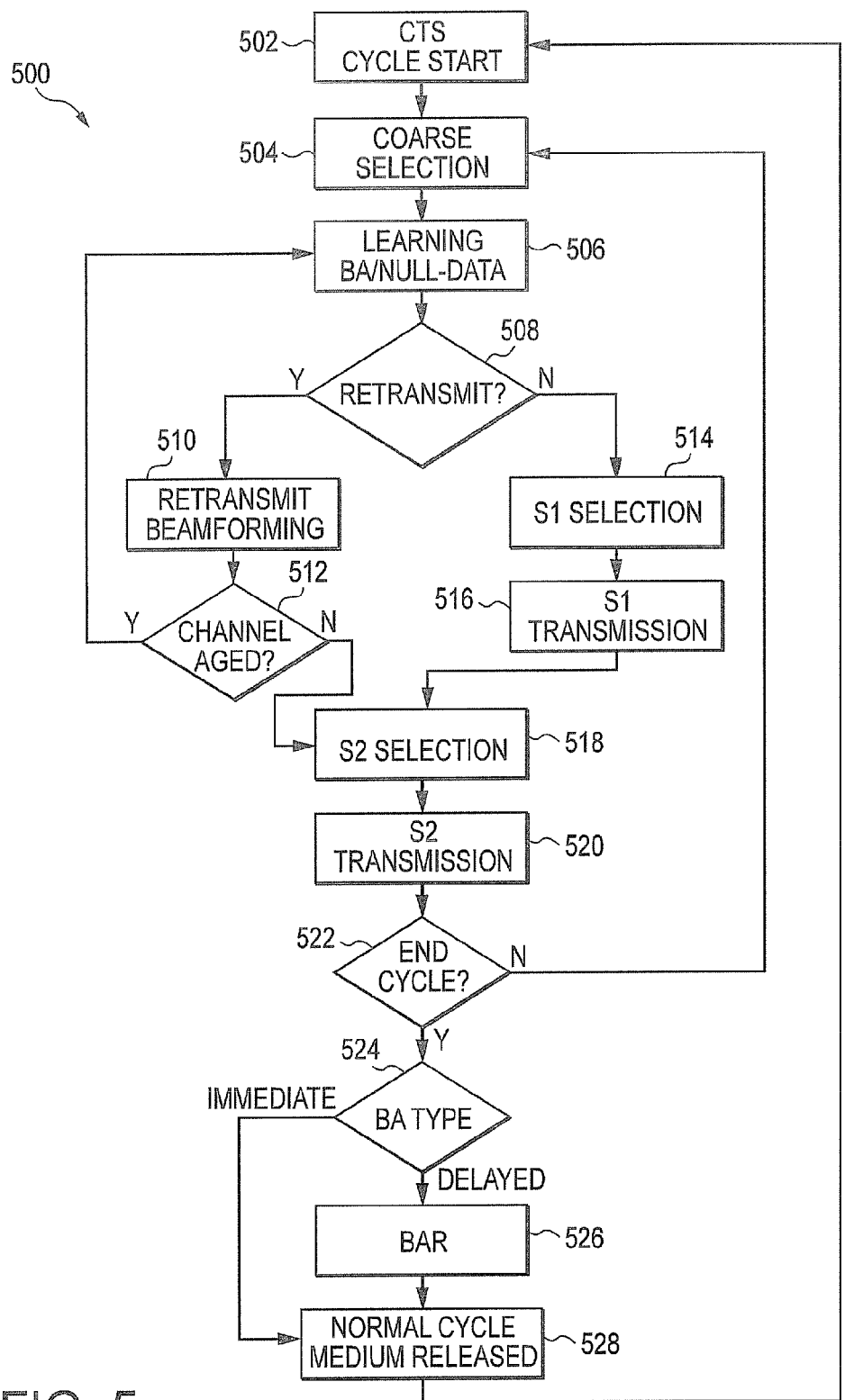
FIG. 5 is a schematic flowchart of a method of wireless transmission in accordance with another demonstrative embodiment of the invention.

Reference is now made to FIG. 5, which schematically illustrates a method of wireless transmission in accordance with another demonstrative embodiment of the invention. Although not limited in this respect, one or more operations of the method of FIG. 5 may be performed by an AP, e.g. AP 110 (FIG. 1), in a WLAN to transmit network data to selected users, e.g., during the $T_{VD}$ period.

As indicated at block 502, the method may include reserving the wireless medium for a duration corresponding to the $T_{VD}$ period. For example, silencing the medium may include sending a clear to send-to-self (CTS-to-self) broadcast frame to indicate that the AP plans to reserve the medium, e.g., as described above with reference to FIG. 2. For example, a Network Allocation Vector (NAV) value in the CTS-to-self frame may include a duration value corresponding to the $T_{VD}$ period, e.g., in order to ensure that all stations able to receive the CTS-to-self frame will refrain from transmitting during the $T_{VD}$ period. The CTS-to-self frame may be sent at a relatively low rate, e.g., at the minimal possible rate, for example, in order to enable far stations to receive the CTS-to-self frame. For example, the CTS-to-self may be transmitted a rate of 6 Mega-bits-per-second (MBPS) OFDM, e.g., if a 5 GHz band is used; or a rate of 1-2 MBPS CCK (11b mode), e.g., if a 2.4 GHZ band is used.

According to some demonstrative embodiments of the invention, the $T_{VD}$ period may be terminated, e.g., by AP 110 (FIG. 1), for example, if queues 150 (FIG. 1) are empty, by sending a CF-end frame. This may result in clearing the NAV values by one or more stations receiving the CF-end frame, thus switching to the $T_{OT}$ period.

According to some demonstrative embodiments of the invention, the $T_{VD}$ period may be extended, e.g., by AP 110 (FIG. 1), for example, if the $T_{VD}$ period is to end and queues 150 (FIG. 1) include frames which are intended to be transmitted during the $T_{VD}$ period, an additional CTS-to-self frame may be sent before the NAV value expires.

According to some demonstrative embodiments of the invention, the duration field of the MAC header for downlink frames, e.g., including learning frames and/or SDMA downlink frames, which may be transmitted, e.g., by AP 110 (FIG. 1), during the $T_{VD}$ period, may include a value indicating the time left until the end of the $T_{VD}$ period. Although the invention is not limited in this respect, in some demonstrative embodiments of the invention, a Length field in a Physical Layer Convergence Procedure (PLCP) Signal symbol, for one or more frames transmitted during the $T_{VD}$ period, e.g., each frame transmitted during the $T_{VD}$ period including the CTS-to-self frame, may include the length of the transmitted frame.

According to some demonstrative embodiments of the invention, the $T_{VD}$ period may be divided into SDMA subcycles. Although the invention is not limited in this respect, each sub-cycle may include, for example, a learning period, and a downlink SDMA transmission succeeding the learning period. The learning period may include, for example, sending downlink probing frames, e.g., Null-Data frames or Block ACK frames, e.g., as described below. The downlink SDMA transmission may include simultaneously transmitting WLAN downlink frames to a chosen SDMA set of stations ("the SDMA Subset"), which may be selected, for example, based on channel state information received during the learning period.

As indicated at block 504, the method may include performing a coarse selection of the SDMA subset of stations from which the relevant candidate stations for the SDMA transmission may be selected. Any coarse subset selection method and/or algorithm may be implemented, e.g., as described above with reference to FIG. 2.

As indicated at block 506, the method may also include performing one or more learning operations during the learning period, to obtain, for example, updated channel estimates and/or spatial signatures. For example, AP 110 (FIG. 1) may sequentially send downlink probe frames to one or more stations to be probed, e.g., to determine the channel estimates of the one or more stations. The uplink channel of a station may be estimated from an uplink frame, e.g., an ACK frame, received in response to the downlink probe transmitted to the station by AP 110 (FIG. 1). The downlink probe frame may include any suitable probe frame. For example, the downlink frame may include a Null Data frame, e.g., if a delayed block ACK scheme is used, or when block ACK is not supported. Alternatively, the probe frame may include a block ACK request frame, e.g., if an immediate block ACK is supported. According to some demonstrative embodiments of the invention, the downlink probe frames may be transmitted in an isotropic manner, e.g., without beamforming. Although the invention is not limited in this respect, the downlink probe frames may be transmitted downlink probe rate such that the probe frame error rate is smaller than a predefined error rate, e.g., $10^{-2}$. The probe frames may be transmitted at a relatively slow rate, e.g., since the probe frames may be relatively short.

According to some demonstrative embodiments of the invention, the method may also include determining whether a probe frame is to be retransmitted, e.g., if a response to the probe frame has not been received, as indicated at block 508. According to some demonstrative embodiments of the invention, a probe frame transmitted to a station may act as a Block ACK Request to the station, e.g., if an immediate Block ACK is supported. A Block ACK frame may be received after a SIFS period, e.g., in response to the Block ACK Request. A retransmission period following the learning period may include frames that were not acknowledged in the Block ACK frame.

According to some demonstrative embodiments of the invention, the probe frames may be retransmitted a predefined number of retransmissions until an ACK is received, as indicated at block 510. The retransmission number may be a configurable system parameter. A probe frame that has reached its retransmission limit may be dropped from the current subset. A renewed attempt to probe this station may be performed at a succeeding learning period. The retransmitted probe frame may be transmitted at a lower rate compared to the transmission rate of the first transmission of the probe frame.

According to some demonstrative embodiments of the invention, the probe frames may be ordered according to predefined priority policy. The policy may include, for example, initially scheduling probe frames intended for stations for which retransmission of frames is planned, e.g., since retransmission may have the maximum priority. Other probe frames may be ordered, for example, according to the QoS weights.

As indicated at block 512, according to some demonstrative embodiments of the invention, the method may include performing the learning operations if the channel estimates have aged, e.g., beyond a predefined aging time period. The aging time period may depend, for example, on the subset size, e.g., a subset including more stations will age faster than a subset with few stations.

According to some demonstrative embodiments of the invention, the downlink transmission may be optionally divided into two consecutive transmissions to two respective subsets of stations during two respective time periods, denoted S1 and S2, respectively. As indicated at block 514, the method may include performing the selection of a preliminary subset. The preliminary subset may be determined, for example, based on channel knowledge of part of the stations, for example, learned during part, e.g., the beginning, of the learning period. The method may also include performing a downlink SDMA transmission to the preliminary subset, e.g., during the period S1, as indicated at block 516.

As indicated at block 518, the method may also include performing a selection of a main subset. The main subset may be determined, for example, based on full channel state knowledge received from substantially most or all of the stations, e.g., at the end of the learning period, e.g., as described above with reference to FIG. 2. As indicated at block 520, the method may also include performing a downlink SDMA transmission to the main subset, e.g., during the period S2.

According to some demonstrative embodiments of the invention, the processing of the channel information gathered during the learning period may consumes a time period, denoted $T_{SDMA\_calc}$. Since the decision on the main subset may not be made until the end of the $T_{SDMA\_calc}$ period, the selection of the preliminary subset may enable performing the SDMA downlink transmission to the preliminary subset, e.g., substantially right after the learning period, based on the channel state of stations probed during part of the learning period, e.g., at the start of the learning period. The transmission time period S1 for the transmission to preliminary subset may be scheduled immediately after the learning period, and the time period for the transmission to the main subset S2 may succeed the period S1.. Although the invention is not limited in this respect, the preliminary subset may have a size of, for example, one frame. The time period S1 may be forced, for example, to be a size one subset, e.g., plain beamforming. It may be assumed that the $T_{SDMA\_calc}$ period is shorter than the period S1, such that the main subset may be determined before the period S1 has ended.

Although the invention is not limited in this respect, according to some demonstrative embodiments of the invention, the downlink SDMA transmission may be performed at the EFS or the UFS, e.g., as described above with reference to FIGS. 2, 3A and/or 3B.

As indicated at block 522, the method may include performing one or more additional SDMA downlink transmissions, e.g., SDMA sub-cycles, for example, if there is enough time remaining within the reserved period $T_{VD}$.

As indicated at block 524, the method may include determining whether an immediate Block ACK or a delayed Block ACK scheme is implemented. As indicated at block 528, the method may include switching to the normal mode of operation, e.g., if the immediate Block ACK scheme is implemented.

If the delayed Block ACK scheme is implemented, the Block ACK frames may be returned during the $T_{OT}$ period. Accordingly, the method may include transmitting Block ACK request frames, e.g., substantially at the end of the $T_{VD}$ period, before the beginning of the $T_{OT}$ period. The delayed Block ACK Request may be acknowledged by a standard ACK frame, e.g., immediately. The Block ACK Request may have a system configurable number of retransmissions. When the retransmission counter reaches the retransmission threshold, the next Block ACK request may be scheduled at the end of the next $T_{VD}$ period.

According to some demonstrative embodiments of the invention, the Block ACK request may request for an acknowledgement of all frames that were transmitted after the last accepted Block ACK reply, e.g., using a sequence number of the first frame for which an acknowledgment is required.

According to some demonstrative embodiments of the invention, a subset, e.g., the main subset or the preliminary subset, may be defined by the set of precoding matrices, or beamforming vectors, which may be associated with the subset. The rate of each frame in the subset may be changed during the lifetime of the subset (i.e. during the time the beamforming vectors stay fixed), e.g., in order to take into account effects of channel aging. For the EFS transmission scheme the power allocation between stations can also be changed. The precoding matrices may change, for example, during the life time of the subset (e.g. to enable channel prediction). Since the precoding matrices cannot change during the transmission of a frame, changing the precoding matrices may be more convenient in EFS mode, where all frames end together. In a subset that immediately follows a block ACK, the preliminary subset downlink transmission may be replaced by a retransmission period, e.g., if retransmission is required. Retransmitted frames may be sent one after the other in beamforming mode, e.g., using a subset of size one, as described above with reference to block 510.

In some other embodiments of the invention, uplink channel impairments may preclude SDMA detection of return ACK signals. For example, as the remote stations simultaneously transmitting ACK signals may not be synchronized with one another, the different uplink signals may undergo different timing and frequency offsets. These differences may cause inter-user interference for existing receive beamforming techniques.

Although embodiments of the invention are not limited in this respect, the AP may be able to detect the presence of an ACK frame without actually decoding the frame. Thus, some embodiments may take advantage of the lack of transmitted data in the ACK frame to reduce the detection requirements on the SDMA AP. A scheme for such detection may include, for example, spatial demultiplexing and/or correlation techniques that use knowledge of certain return ACK signal parameters such as, for example, gain frequency offset and/or spatial signature, e.g., as obtained in the channel query of block 230. Examples of detection schemes in accordance with demonstrative embodiments of the invention are described below with reference to FIGS. 6 and 7.

Figure 6:
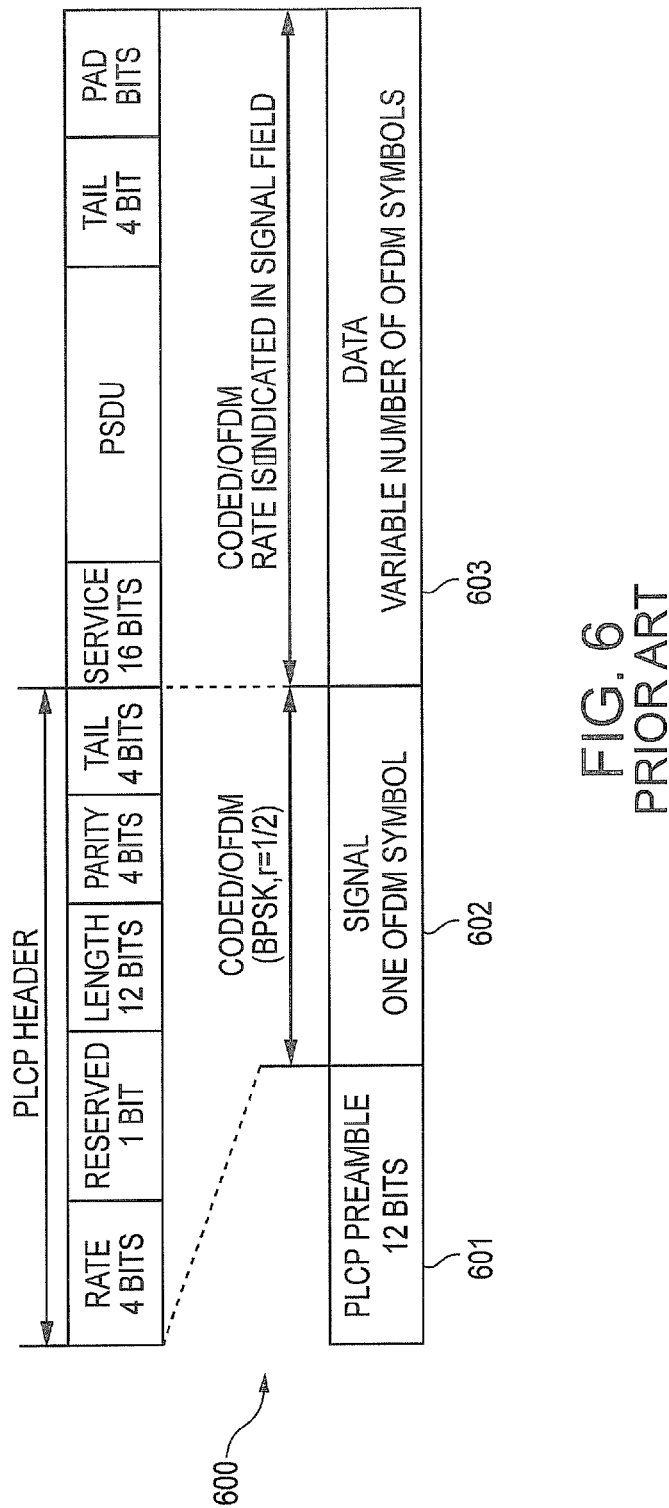
FIG. 6 is a schematic illustration of a frame format for a transmission mode.

Reference is now made to FIG. 6, which schematically illustrates a frame format 600 for an Orthogonal Frequency Division Multiplexing (OFDM) transmission mode. Frame format 600 may begin with a PLCP preamble signal 601, which may include a Short Preamble (SP) and a Long Preamble (LP), as known in the art. Preamble signal 601 may be followed by a Signal symbol 602, and data carrying symbols 603. Although the invention is not limited in this respect, the duration of each data carrying symbol may be, for example, 4 µSec, and may be composed of a 3.2 µSec data symbol and a 0.8 µSec Guard Interval (GI) which may be referred to as a Cyclic Prefix (CP). As is known in the art, the CP may precede the data symbol and may be a copy of a last portion, e.g., the last 0.8 µSecs of the corresponding data symbol.

Figure 7:
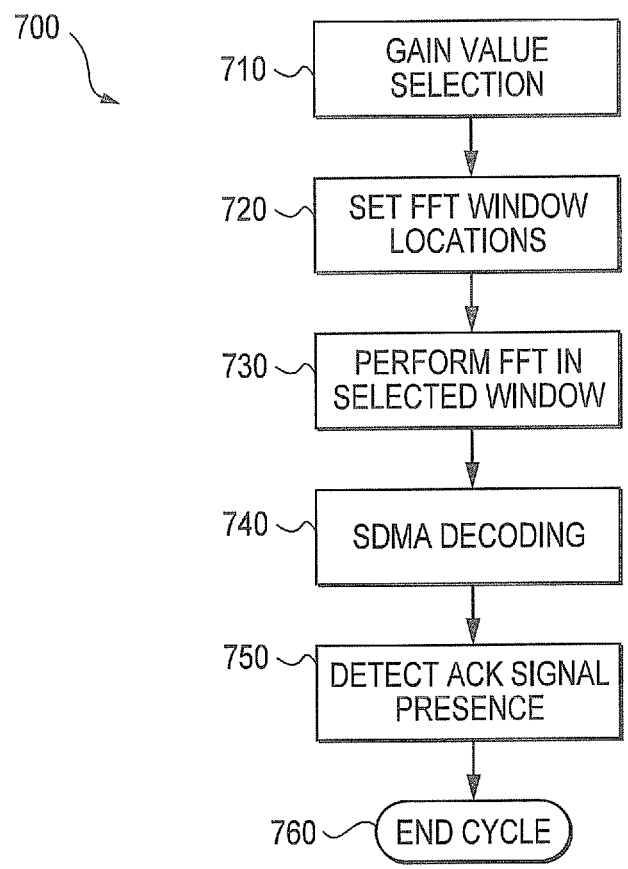
FIG. 7 is a schematic flowchart of a return acknowledgment (ACK) frame detection method in accordance with some demonstrative embodiments of the invention.

Reference is now made to FIG. 7, which is a schematic flowchart of a return ACK frame detection method 700 in accordance with some demonstrative embodiments of the invention. Although not limited in this respect, the return ACK detection method 700 may be performed by a suitable AP in a WLAN, e.g., SDMA AP 110 (FIG. 1), to detect return ACK frames from a set of K remote stations to which AP 110 (FIG. 1) may have transmitted data frames.

As indicated at block 710, return ACK detection method 700 may include setting gain values at an AP, e.g., AP 110, for return ACK detection. The end of a downlink transmission to a set of remote stations, e.g., SDMA cycle 200 of FIG. 2, may indicate the start of a SIFS period generated by each station. For some demonstrative embodiments of the invention, an AP may preset appropriate gain values during the SIFS period prior to the start of the ACK signals. For example, the AP may estimate the expected receive power from each station of the set during an uplink query in the downlink transmission cycle, e.g., uplink query 230 of FIG. 2, and preset appropriate gain values based on the sum of these expected receive powers. Presetting the gain values may also eliminate the need to activate an Automatic Gain Control (AGC) circuit in an AP for reception. As is known in the art, an AGC circuit may take a certain time period, e.g., at least 4 µSecs, to converge. Thus, reliance on the AGC may prevent using a beginning part of the ACK frame preamble signal, e.g., the SP, for detection purposes.

As indicated at block 720, return ACK detection method 700 may include setting Fast Fourier Transform (FFT) window locations for detecting the preamble signals of a number of return ACK frames, e.g., K return ACK frames. According to some demonstrative embodiments, e.g., when using an OFDM modulation scheme having a 3.2 µSec data symbol, the FFT window may start substantially immediately after the CP in order to allow demodulation of the entire OFDM data symbol. In other demonstrative embodiments, e.g., where the CP may be a cyclic extension of the data symbol, the FFT window may start at any point during the CP, and OFDM demodulation may still be viable. It will be appreciated that any time shift in starting the FFT window may translate to a recoverable phase shift in the frequency domain after the FFT.

Although embodiments of the invention are not limited in this respect, a MAC protocol, e.g., as defined in the IEEE 802.11 specification, may allow some tolerance in SIFS generation timing by remote stations. For example, this tolerance may be about ±10% of a slot time: a system having a slot time of 20 µSecs may have an uncertainty in the start of the preamble of about ±2 µSecs. For such a system, the preambles being received at the AP may have a relative timing offset of up to 4 µSecs. In addition, the FFT window size for demodulation may be specified by an operational mode or modulation scheme of an existing standard, for example, 3.2 µSecs for OFDM according to IEEE 802.11. Thus, due to these constraints, in some embodiments it may not be possible to find a single FFT window start time for uplink SDMA that will be valid for the incoming frames of all K signals.

Figure 8:
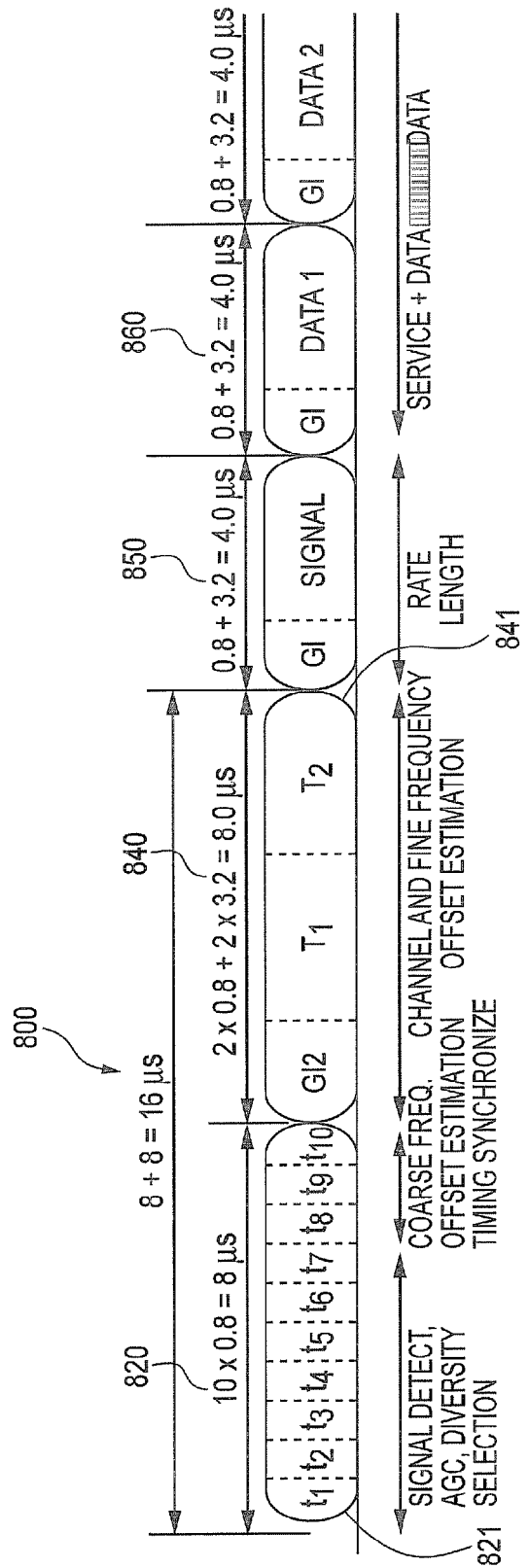
FIG. 8 is a schematic illustration of a structure of a preamble signal.

Reference is now made to FIG. 8, which schematically illustrates a structure of a preamble signal 800, e.g., preamble signal 601 of FIG. 6. For some embodiments of the invention, the duration of preamble signal 800 may be, for example 16 µSecs. Accordingly, the preamble may include a Short Preamble (SP) 820 with a duration of, e.g., 8 µSec, and a Long Preamble (LP) 840 with a duration of, e.g., 8 µSec. The SP may include a number of repetitions of the $t_i$ signal 821, for example, 10 repetitions wherein each repetition is, e.g., 0.8 μSecs long. The LP may include a number of repetitions of the $T_i$ signal 841, for example, 2.5 repetitions wherein each repetition is, e.g., 3.2 μSecs long. In accordance with the frame format in use, preamble signal 800 may be followed by a signal field 850 and one or more data symbols 860, as known in the art.

Referring back to FIG. 7, According to some demonstrative embodiments of the invention, setting the FFT window locations may include setting separate FFT window start times for the SP and for the LP of the return ACK frames, e.g., when there is no valid single FFT window for the frames of all K signals. For example, there may be a valid FFT window for individual demodulation of the SP and the LP when their respective durations are longer than a maximal time offset. For example, if both the short and long preambles have durations of 8 μSecs and the maximal time offset is 4 μSecs, there may be a span of at least 4 μSecs for a valid FFT window for each preamble signal.

Although embodiments of the invention are not limited in this respect, the SP FFT window location may be specified as a percentage of a slot time, e.g., about 10%, plus an additional time period, e.g., the CP time period, after the expected start time of the received preambles. The extended slot time may ensure that all received ACK signals overlap in time, while the additional CP delay may ensure orthogonality of the different bins, and may thereby enable proper demodulation. For some demonstrative embodiments that operate partially or completely in accordance with IEEE 802.11 standards, the SP FFT window location may be, for example, between 1 and 2 μSecs plus a CP time after the expected start time of the preambles, depending on the specific 802.11 mode. Although embodiments of the invention are not limited in this respect, the LP FFT window location may be set to commence at a certain time delay after the SP window location. For example, a delay equal to the duration of the SP. For example, for embodiments that operate partially or completely in accordance with IEEE 802.11 standards, the LP FFT window location may be 8 μSecs after the SP window location.

In some embodiments, return ACK detection method 700 may include performing the FFT in the selected windows on signals received via the one or more antennas of AP 110, as indicated at block 730. For a set of N antennas, a total of N Fast Fourier Transforms may be performed for each preamble signal, to produce a FFT output vector of size N. It will be appreciated that in embodiments where more than one FFT window is set for each frame, e.g., a SP window and a LP window, method 700 may include performing 2N transformations to produce the output vector of size N.

As indicated at block 740, method 700 may include performing SDMA decoding to obtain a vector that may represent the incoming preamble signal from each of, e.g., K stations. According to some demonstrative embodiments of the invention, the output of the N FFTs in each of the output frequency bins may be a vector of size N. To demultiplex the K preamble signals, method 700 may include applying a precoding matrix W to the FFT output vector in each frequency bin. For example, precoding matrix W may be an N×K matrix including, for example, a set of K beam forming vectors of size N, e.g., as generated for transmission to K stations through a set of N spatial channels, where N is the number of transmit antennas. Precoding matrix W may be generated for downlink transmission by the SDMA preprocessor, as explained above with reference to FIG. 1. In accordance with embodiments of the invention, applying W to the FFT output vector may result in a vector of size K, e.g., $\underline{y}_k$, which may represent the preamble signal for each of a set of K receiving stations.

As indicated at block 750, method 700 may include detecting the presence of a return ACK preamble signal for each station. It will be appreciated that preamble vector $\underline{y}_k$ may include some noise distortion, e.g., acquired while passing through the effective channel for each station. Thus, if a station sent a return ACK signal, the corresponding portion of the preamble vector may include both signal and noise; whereas if a station did not send a return ACK signal, the corresponding portion of the preamble vector may include only noise. Although embodiments of the invention are not limited in this respect, testing for each station's ACK signal presence may include discerning between two hypotheses:

$$H_1: y_k = s_k \cdot h_k + n_k$$

$$H_0: y_k = n_k \tag{Equation 2}$$

where hypothesis $H_1$ assumes that an ACK signal has been sent and hypothesis $H_0$ assumes that an ACK signal has not been sent (i.e., that a received signal may include only noise). According to hypothesis $H_1$, a received signal in the k-th frequency bin, $y_k$, may be a corresponding preamble value, e.g., $s_k$, multiplied by a channel coefficient, e.g., $h_k$, plus a noise signal, e.g., $n_k$. According to hypothesis $H_0$, a received signal in the k-th frequency bin, e.g., $y_k$, may be a noise-only signal, e.g., $n_k$.

According to some embodiments of the invention, a $s_k \cdot h_k$ signal may be known from receipt of an appropriate preamble signal during a previous uplink query. As is known in the art, for a known signal, e.g., $s_k \cdot h_k$, an optimal detector may be a correlator, e.g., $\chi$, which may be calculate according to the following equation:

$$\chi = \langle y, s \cdot h \rangle = \sum_k y_k \cdot (s_k \cdot h_k)^* \tag{Equation 3}$$

Accordingly, detecting ACK signal presence may include comparing the correlator output to a threshold value, e.g., $\tau$ to determine if an ACK signal has been sent. For example, the following set of equations may be used to test the hypotheses $H_1$ and $H_0$:

$$\chi > \tau \rightarrow H_1$$

$$\chi < \tau \rightarrow H_0 \tag{Equation 4}$$

In some embodiments, detecting ACK signal presence may optionally include one or more fine-tuning techniques. For example, the threshold value $\tau$ may be tuned to provide a good balance between the probability for misdetection and the probability for false alarm. In some embodiments, for example, the correlation outputs (e.g., the energy detection values) from different sections of preamble signals (e.g. SP and LP signals), may be averaged to provide a more robust detection process. Additionally or alternatively, in some embodiments a received signal such as $y_k$ may be phase adjusted to correct for a time shift in the FFT window prior to correlation, as is known in the art. Accordingly, the preamble signals received during a previous uplink query may be stored without frequency offset compensation, e.g., to enable detection of signals coming from different remote stations having different frequency offsets.

In some embodiments, e.g., in a sufficiently high SNR environment, detecting ACK signal presence may include using a simple energy detector. It will be appreciated that, because the noise distortion component of the received signal may be relatively small in a high SNR environment, an energy detection method may be sufficient for detecting ACK presence. For example, the detector may apply the following equation:

$$\chi = \langle y, y \rangle = \sum_k y_k^2 \qquad \text{(Equation 5)}$$

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by AP 110 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method of performing simultaneous downlink transmission over a wireless medium to a plurality of wireless stations, the method comprising:

selecting a set of the plurality of wireless stations according to one or more ranking criteria; and
reserving the wireless medium for a duration sufficient for completing the simultaneous downlink transmission to the wireless stations of said set,
wherein selecting said set comprises selecting a preliminary subset based on channel state estimation received during a first learning interval, and selecting a main subset based on channel state estimation received during a second learning interval including said first learning interval,
wherein said method further comprises performing simultaneous downlink transmission to stations of said main subset after performing simultaneous downlink transmission to stations of said preliminary subset,
wherein said main and preliminary subsets are defined by a set of beamforming vectors, associated with the corresponding subset, and
wherein a rate of each frame in the subset is changeable during a lifetime of the subset.

2. The method of claim 1, wherein reserving the wireless medium comprises reserving the wireless medium for a predefined high-priority transmission interval.

3. The method of claim 1 comprising assigning data to be transmitted to the plurality of wireless stations into a plurality of respective queues according to one or more priorities.

4. The method of claim 1, wherein said ranking criteria comprise one or more criteria related to data priority, signal strength, prior subset selection information, and one or more quality-of-service parameters.

5. The method of claim 1, wherein reserving the wireless medium comprises transmitting a clear-to-send-to-self frame having a value corresponding to said duration.

6. The method of claim 1 comprising transmitting at least channel request frame to at least one station of said set, and receiving an estimate of a channel state corresponding to said station in response to said channel request frame.

7. The method of claim 1 comprising estimating at least one channel state corresponding to at least one station of said set.

8. The method of claim 7 comprising receiving from one or more of said set of wireless stations a response to an uplink query, wherein estimating said channel state comprises estimating said channel state based on said response.

9. The method of claim 8 comprising sending a null-data frame to the wireless stations of said set, wherein receiving said response comprises receiving acknowledgement frames from said wireless stations.

10. The method of 7 comprising computing beamforming vectors based on said channel state, and the selected subset.

11. The method of claim 1, wherein selecting said set comprises partially equalized time spans of data to be transmitted to the wireless stations of said set.

12. The method of claim 11, wherein said partially equalized time spans comprises selecting wireless stations having data sequences of comparable lengths in their respective queues and having comparable receive signal strengths.

13. The method of claim 11, wherein partially equalizing said time spans comprises fragmenting a first frame into a plurality of fragments having a duration equal to a duration of a second frame.

14. The method of claim 1, further comprising selecting a partial subset of said set of wireless stations according to a further ranking criterion.

15. The method of claim 14, wherein said further ranking criterion comprises one or more criteria selected from a group of optimization metrics including a maximum sum-rate, a maximum weighted sum-rate based on queue status, and a maximum of the minimum rate of the wireless stations in the subset.

16. The method of claim 14, wherein selecting said partial subset comprises partially equalized time spans of data to be transmitted to the wireless stations of said subset.

17. The method of claim 16, wherein said partially equalized time spans comprises selecting wireless stations having data sequences of comparable lengths in their respective queues and having comparable receive signal strengths.

18. The method of claim 16, wherein said partially equalized time spans comprises controlling a transmit rate for the wireless stations of said subset.

19. The method of claim 18, wherein controlling said transmit rate comprises adjusting a power allocation for each of the wireless stations of said subset.

* * * * *